United States Patent
Matsuura

(10) Patent No.: US 11,926,084 B2
(45) Date of Patent: Mar. 12, 2024

(54) MOLD CLAMPING DEVICE AND INJECTION MOLDING MACHINE

(71) Applicant: THE JAPAN STEEL WORKS, LTD., Tokyo (JP)

(72) Inventor: Kyouhei Matsuura, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 17/592,813

(22) Filed: Feb. 4, 2022

(65) Prior Publication Data

US 2022/0250298 A1    Aug. 11, 2022

(30) Foreign Application Priority Data

Feb. 5, 2021 (JP) ................... 2021-017165

(51) Int. Cl.
*B29C 45/67* (2006.01)
*B29C 45/17* (2006.01)
*B29C 45/68* (2006.01)

(52) U.S. Cl.
CPC .......... *B29C 45/67* (2013.01); *B29C 45/1747* (2013.01); *B29C 45/1756* (2013.01); *B29C 45/1761* (2013.01); *B29C 2045/688* (2013.01)

(58) Field of Classification Search
CPC .......... B29C 45/1747; B29C 2045/688; B29C 45/1761
See application file for complete search history.

(56) References Cited

U.S. PATENT DOCUMENTS

| | | |
|---|---|---|
| 3,505,708 A | 4/1970 | Moslo |
| 2003/0082260 A1 | 5/2003 | Kishi et al. |
| 2003/0190386 A1* | 10/2003 | Fujita ................... B29C 45/68 |
| | | 425/589 |

(Continued)

FOREIGN PATENT DOCUMENTS

| | | | |
|---|---|---|---|
| AT | 009 903 U1 | 5/2008 | |
| DE | 60 2004 002 976 T2 | 2/2007 | |

(Continued)

OTHER PUBLICATIONS

Communication dated Aug. 30, 2023 by the Japanese Patent Office for Japanese Patent Application No. 2021-017165.

(Continued)

*Primary Examiner* — Alison L Hindenlang
*Assistant Examiner* — Debjani Roy
(74) *Attorney, Agent, or Firm* — Sughrue Mion, PLLC

(57) ABSTRACT

There are provided a mold clamping device and an injection molding machine including a guide mechanism which reliably prevents falling of a movable platen. The mold clamping device includes: a fixed platen fixed to a bed; a mold clamping housing configured to be slidable on the bed; a movable platen configured to be slidable on the bed between the fixed platen and the mold clamping housing; a plurality of tie-bars connecting the fixed platen and the mold clamping housing and penetrating the movable platen; a mold clamping mechanism provided between the mold clamping housing and the movable platen; a linear guide provided with the movable platen and configured to slide with respect to the bed; and a tie-bar guide bush provided with the movable platen and configured to slide with respect to the tie-bar.

10 Claims, 8 Drawing Sheets

(56) References Cited

U.S. PATENT DOCUMENTS

| | | | |
|---|---|---|---|
| 2004/0208952 A1 | 10/2004 | Nishimura et al. | |
| 2016/0121530 A1 | 5/2016 | Yoda | |
| 2017/0312952 A1 | 11/2017 | Nagami et al. | |
| 2018/0001378 A1* | 1/2018 | Murata | B22D 17/26 |
| 2019/0118447 A1 | 4/2019 | Kilian et al. | |
| 2021/0016469 A1* | 1/2021 | Sugiura | B29C 45/1761 |
| 2021/0221040 A1 | 7/2021 | Kilian et al. | |

FOREIGN PATENT DOCUMENTS

| | | | |
|---|---|---|---|
| DE | 10 2018 125 919 A1 | 4/2019 | |
| EP | 0 503 584 A2 | 9/1992 | |
| EP | 1 356 914 A1 | 10/2003 | |
| JP | 3-20128 U | 2/1991 | |
| JP | 7-156232 A | 6/1995 | |
| JP | 2003-191301 A | 7/2003 | |
| JP | 2008-12813 A | 1/2008 | |
| JP | 2016-97554 A | 5/2016 | |
| WO | 2007/041881 A1 | 4/2007 | |
| WO | WO-2016163861 A1 * | 10/2016 | B22F 3/1055 |

OTHER PUBLICATIONS

Communication dated Oct. 5, 2023 by the Austrian Patent Office for Austrian Patent Application No. A 50062/2022.

Austrian Third party observations issued on Nov. 10, 2023 in Austrian Patent Application No. A50062/2022.

\* cited by examiner

MOLD CLAMPING DEVICE AND INJECTION MOLDING MACHINE

CROSS-REFERENCE TO RELATED APPLICATIONS

This application is based on and claims priority under 35 USC 119 from Japanese Patent Application No. 2021-017165 filed on Feb. 5, 2021, the contents of which are incorporated herein by reference.

TECHNICAL FIELD

The present disclosure relates to a mold clamping device in which a movable platen slides on a bed by a linear guide when molds are opened and closed, and an injection molding machine including such a mold clamping device.

BACKGROUND

A mold clamping device of an injection molding machine generally includes a fixed platen, a mold clamping housing, a movable platen, a plurality of tie-bars, and a mold clamping mechanism. The fixed platen is fixed to a bed, and the mold clamping housing and the movable platen are provided so as to be slidable on the bed. The fixed platen and the mold clamping housing are connected by the plurality of tie-bars, and these tie-bars penetrate the movable platen. The mold clamping mechanism may include a toggle mechanism, a mold clamping cylinder, or the like, which is provided between the mold clamping housing and the movable platen. Therefore, when the mold clamping device is driven, the movable platen slides on the bed to open and close molds.

The movable platen is provided with a guide mechanism in order to prevent a verticality of the movable platen from being tilted, that is, from falling, and to slide accurately and smoothly. Two types of guide mechanisms, that is, a tie-bar guide bush and a linear guide, are well known. The tie-bar guide bush is provided in a through hole through which the tie-bar of the movable platen penetrates, and the tie-bar guide bush and the tie-bar slide to guide the movable platen. The linear guide is described in JP-A-2008-12813 (Patent Literature 1) and the like. The linear guide is provided between the bed and the movable platen. Either one of the guide mechanisms is adopted for the movable platen.

SUMMARY

A linear guide is excellent due to high durability and low possibility to break down even when being operated for a long period of time. Therefore, in recent years, the linear guide is often adopted as a guide mechanism of a movable platen. However, the linear guide may cause the movable platen to fall. For example, when a mold having a large weight is attached, a center of gravity of the movable platen and the mold is shifted toward the mold. In this case, falling is likely to occur at the time of opening and closing of molds or mold clamping. Alternatively, when a mold clamping mechanism is formed of a toggle mechanism, pins connecting links of the toggle mechanism and bushes provided on these pins are worn by long-term operation. Due to this wear, symmetry of the toggle mechanism is broken, a balance of a force acting on the movable platen is lost, and the movable platen is likely to fall. The linear guide cannot completely prevent occurrence of falling.

The present disclosure provides a mold clamping device including a guide mechanism capable of reliably preventing falling of a movable platen, and an injection molding machine.

Other problems and novel features will become apparent from description of the present specification and the accompanying drawings.

The present disclosure is configured as a mold clamping device including a guide mechanism for a movable platen and an injection molding machine including such a mold clamping device. The mold clamping device includes a fixed platen, a mold clamping housing, and a movable platen. The fixed platen is fixed to a bed, and the mold clamping housing and the movable platen slide on the bed. The mold clamping housing and the fixed platen are connected by a plurality of tie-bars, and the tie-bars penetrate the movable platen. A mold clamping mechanism is provided between the mold clamping housing and the movable platen. According to the present disclosure, in such a mold clamping device, a slide mechanism of the movable platen includes a linear guide that slides with respect to the bed and a tie-bar guide bush that slides with respect to the tie-bar.

The present disclosure has an effect of stably guiding opening and closing of the movable platen for a long period of time and reliably preventing the movable platen from falling.

DETAILED DESCRIPTION

Figure 1:
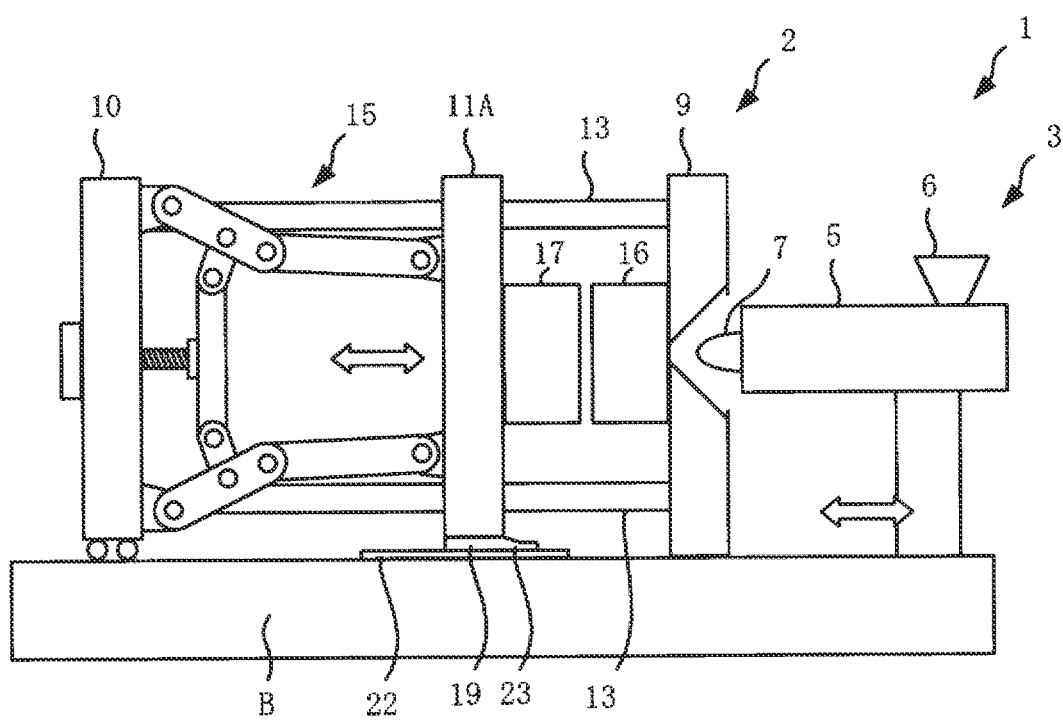
FIG. 1 is a front view showing an injection molding machine according to the present illustrative embodiment.

Hereinafter, specific illustrative embodiments will be described in detail with reference to the drawings. However, the present disclosure is not limited to the following illustrative embodiments. The following description and drawings are simplified as appropriate to clarify the description. In the drawings, the same elements are denoted by the same reference numerals, and repeated description thereof is omitted as necessary. In addition, hatching may be omitted to avoid complicating the drawings.

The present illustrative embodiment will be described.

<Injection Molding Machine>

An injection molding machine 1 according to the present illustrative embodiment is configured as shown in FIG. 1. That is, a mold clamping device 2 and an injection device 3 according to the present illustrative embodiment to be described below are schematically configured. Although simplified in FIG. 1, the injection device 3 includes a heating cylinder 5 and a screw (not shown) provided in the heating cylinder 5. The heating cylinder 5 is provided with a hopper 6 that supplies an injection material and an injection nozzle 7.

<Mold Clamping Device>

The mold clamping device 2 according to the present illustrative embodiment includes a fixed platen 9 fixed on a bed B, a mold clamping housing 10 that slides on the bed B, and a movable platen 11A according to a first illustrative embodiment that similarly slides on the bed B. The fixed platen 9 and the mold clamping housing 10 are connected by a plurality of, for example, four tie-bars 13. The movable platen 11A is penetrated by the tie-bars 13 and is slidable with respect to the fixed platen 9. A mold clamping mechanism 15 is provided between the mold clamping housing 10 and the movable platen 11A. The fixed platen 9 and the movable platen 11A are provided with molds 16, 17, respectively. Therefore, when the mold clamping mechanism 15 is driven, the molds 16, 17 are opened and closed. The mold clamping mechanism 15 may be formed of a mold clamping cylinder that is driven by a hydraulic pressure, and a type thereof is not limited, but a toggle mechanism is adopted in the present illustrative embodiment.

<Guide Mechanism for Movable Platen>

Figure 2:
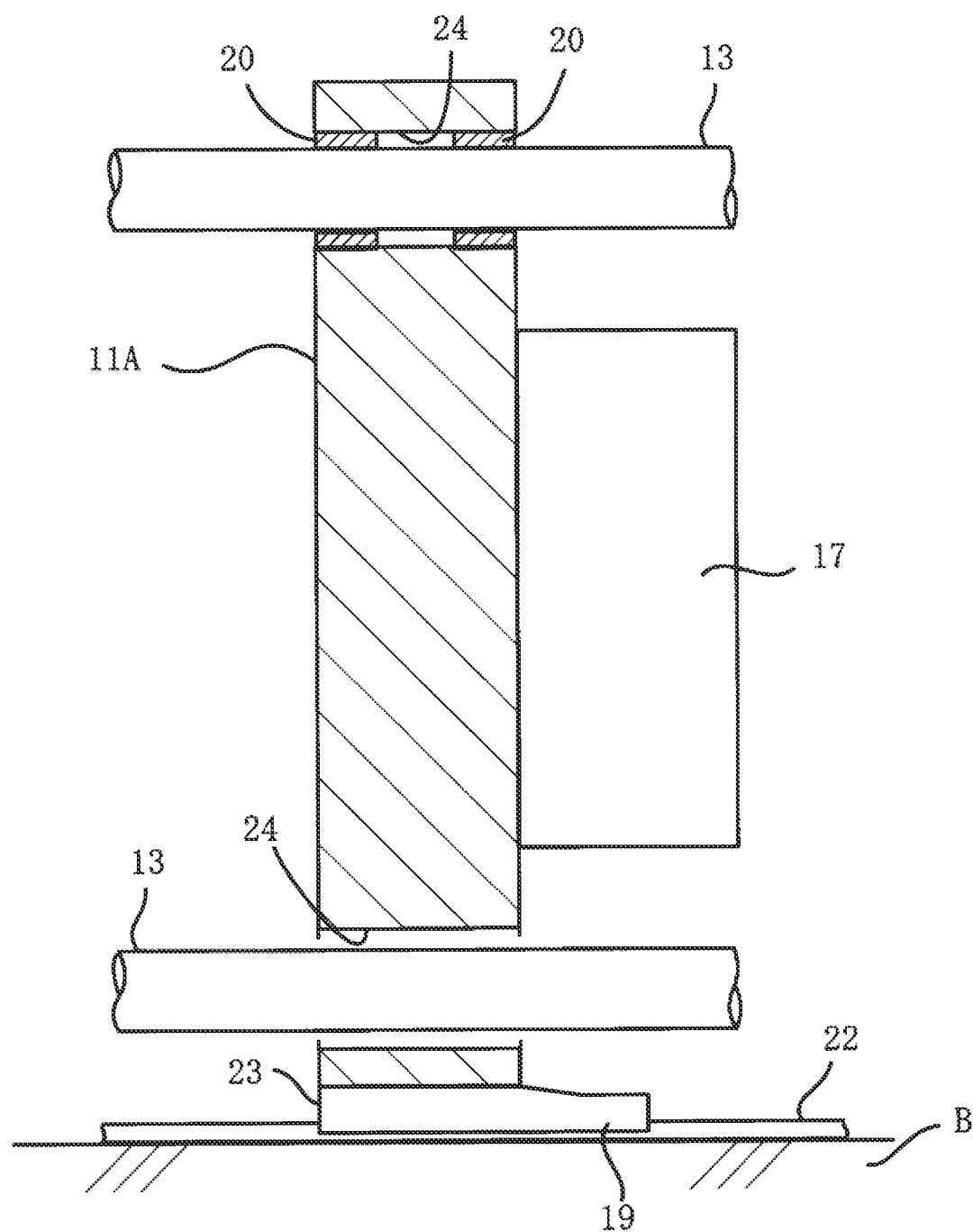
FIG. 2 is a front cross-sectional view showing a movable platen and tie-bars of a mold clamping device according to the present illustrative embodiment.

The present illustrative embodiment is characterized in that the movable platen 11A is provided with two different types of guide mechanisms as shown in FIG. 2. This will be described.

<Linear Guide>

The movable platen 11A according to the first illustrative embodiment is first provided with a linear guide 19 as a guide mechanism. The linear guide 19 includes a rail 22 fixed on the bed B and a slider 23 that slides on the rail 22. The slider 23 is fixed to a bottom portion of the movable platen 11A. Since the movable platen 11A includes the linear guide 19 as the guide mechanism, the movable platen 11A can slide on the bed B sufficiently smoothly.

<Tie-Bar Guide Bush>

In the first illustrative embodiment, the movable platen 11A is further provided with tie-bar guide bushes 20 as a guide mechanism. More specifically, in the movable platen 11A, the tie-bar guide bushes 20 are provided in guide holes 24 through which the tie-bars 13 penetrate.

However, in the first illustrative embodiment, the tie-bar guide bushes 20 have two more features. The first feature is that the tie-bar guide bushes 20 are provided only for the tie-bars 13 disposed in an upper portion, and are not provided for the tie-bars 13 disposed in a lower portion. As will be described later, this is because an effect of preventing falling of the movable platen 11A can be sufficiently obtained only by providing the tie-bar guide bushes 20, 20 for the tie-bars 13, 13 disposed in the upper portion.

Figure 3:
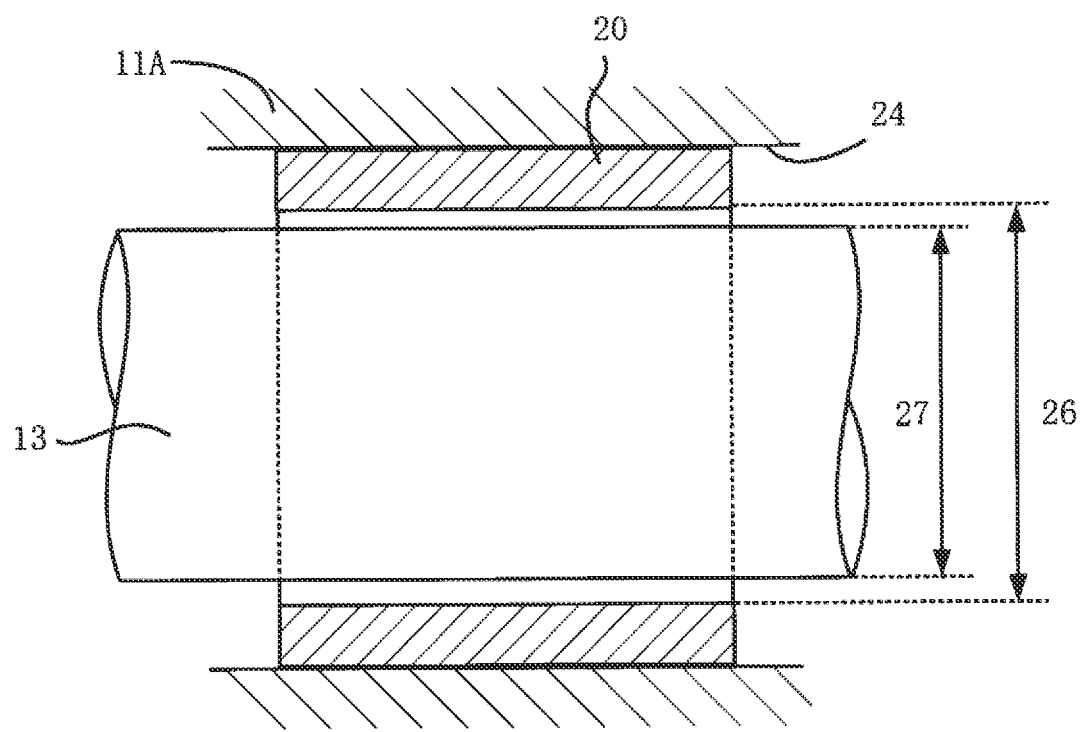
FIG. 3 is a front cross-sectional view showing a part of a movable platen, a tie-bar, and a tie-bar guide bush according to a first illustrative embodiment.

The second feature is fit tolerance between the tie-bar guide bushes 20 and the tie-bars 13. FIG. 3 shows the tie-bar guide bush 20 provided in the guide hole 24 of the movable platen 11A. An inner diameter 26 of the tie-bar guide bush 20 is larger than an outer diameter 27 of the tie-bar 13 penetrating the tie-bar guide bush 20.

In general, a degree of fit between a shaft and a hole is referred to as interference fit when a shaft diameter is larger than a hole diameter, transition fit when a shaft diameter is substantially equal to a hole diameter, and clearance fit when a shaft diameter is smaller than a hole diameter. A related-art movable platen having only a tie-bar guide bush as a guide mechanism adopts the tie-bar guide bush for clearance fit in a state of easy running fit. However, the first illustrative embodiment adopts the tie-bar guide bushes 20 for clearance fit in a state of loose running fit that is looser fit. Specifically, the related art adopts "H7", "H8", and the like, which indicate a state of easy running fit, as a tolerance class of a hole. The tolerance class is determined based on the outer diameter 27 of the tie-bar 13, so-called axial reference. However, the first illustrative embodiment adopts "D7", "D8", and the like which indicate loose running fit. For example, in a case where "D7" is adopted, when the outer diameter 27 of the tie-bar 13 is 160 mm, the inner diameter 26 of the tie-bar guide bush 20 is manufactured to be 160.145 mm to 160.185 mm.

As described above, in the first illustrative embodiment, since the tie-bar guide bushes 20, 20, . . . provided in the movable platen 11A are clearance-fitted to the tie-bars 13 in the state of loose running fit, a sliding load of the tie-bar guide bushes 20 is small. This is because, since the movable platen 11A is mainly guided by the linear guide 19, a frequency of contact between the tie-bar guide bushes 20 and the tie-bars 13 is low, and a surface pressure P of the tie-bar guide bushes 20 and the tie-bars 13 is small. Therefore, even when the movable platen 11A is performing mold opening and closing at a high speed, a PV value serving as a product of a sliding speed V does not exceed an allowable PV value of the tie-bar guide bushes 20, 20, . . . . That is, there is provided an advantageous configuration in which molds can be opened and closed at a high speed and injection molding can be performed in a high cycle.

<Operation of Mold Clamping Device According to Present Illustrative Embodiment>

Figure 4:
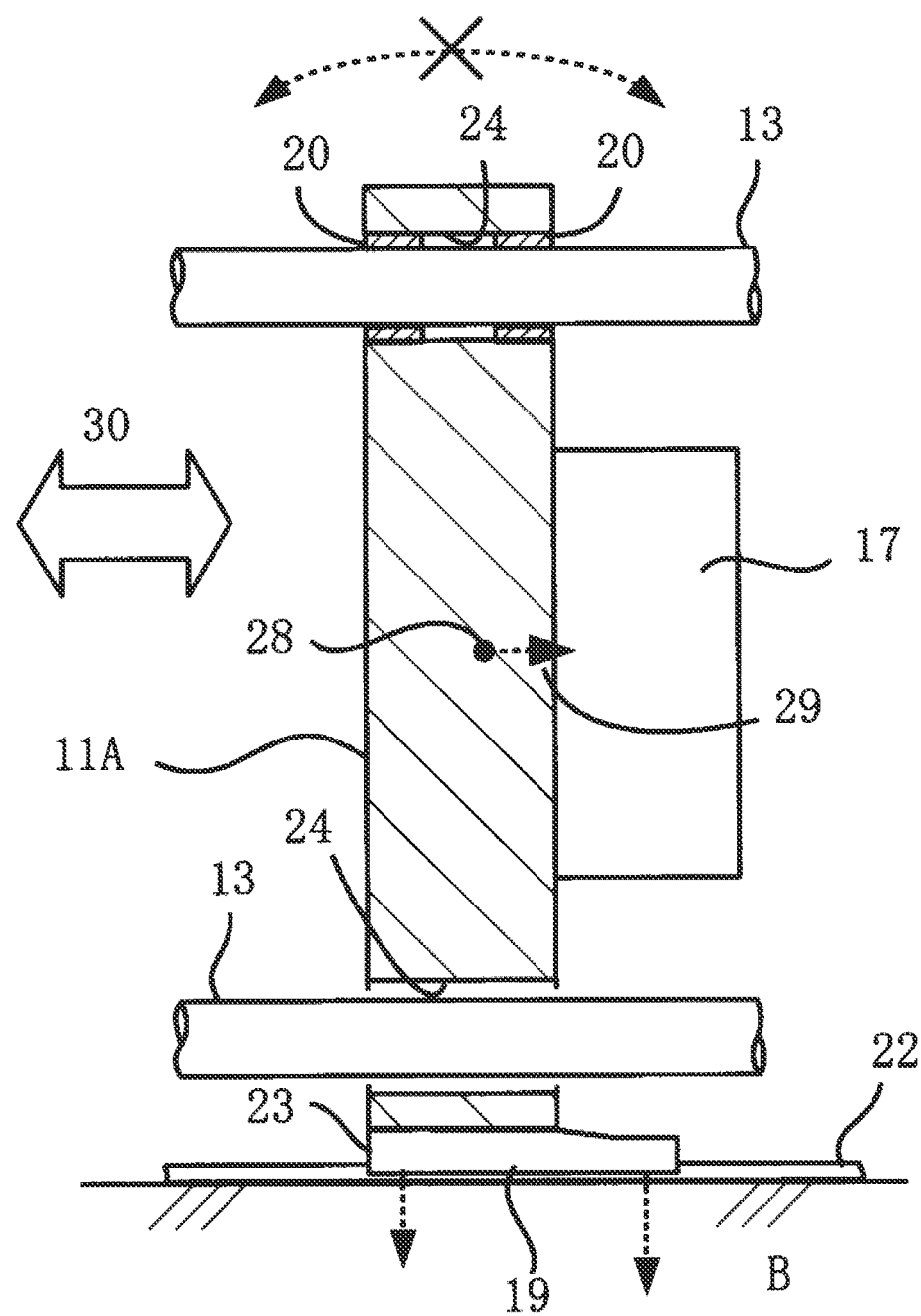
FIG. 4 is a front cross-sectional view showing the movable platen and the tie-bars according to the first illustrative embodiment.

An operation of the mold clamping device 2 according to the present illustrative embodiment will be described. As shown in FIG. 4, the mold 17 is attached to the movable platen 11A. Then, a center of gravity 28 of the movable platen 11A shifts in a direction of an arrow 29 as a weight of the mold 17 increases. As the center of gravity 28 is displaced in a direction of the mold 17, a load is more concentrated on a right side of the linear guide 19 than on a left side in FIG. 4. This generates a moment of a clockwise force in the movable platen 11A, and thus the movable platen 11A easily falls.

When the mold clamping mechanism 15 is driven to open and close the molds, the movable platen 11A slides as indicated by an arrow 30. Since the movable platen 11A according to the first illustrative embodiment is guided not only by the linear guide 19 but also by the tie-bar guide bushes 20, 20, falling is reliably prevented. The falling of the movable platen 11A can be sufficiently prevented by the tie-bar guide bushes 20, 20 provided corresponding to the tie-bars 13, 13 disposed in the upper portion. The movable platen 11A smoothly slides without falling even when the molds are opened and closed at a high speed. Since the movable platen 11A is prevented from falling, the linear guide 19 is also prevented from being damaged. Existence of the tie-bar guide bushes 20, 20 also has an effect of alleviating a bias of the load acting on the linear guide 19 toward the right side.

<Comparison with Related-Art Mold Clamping Device>

Figure 5:
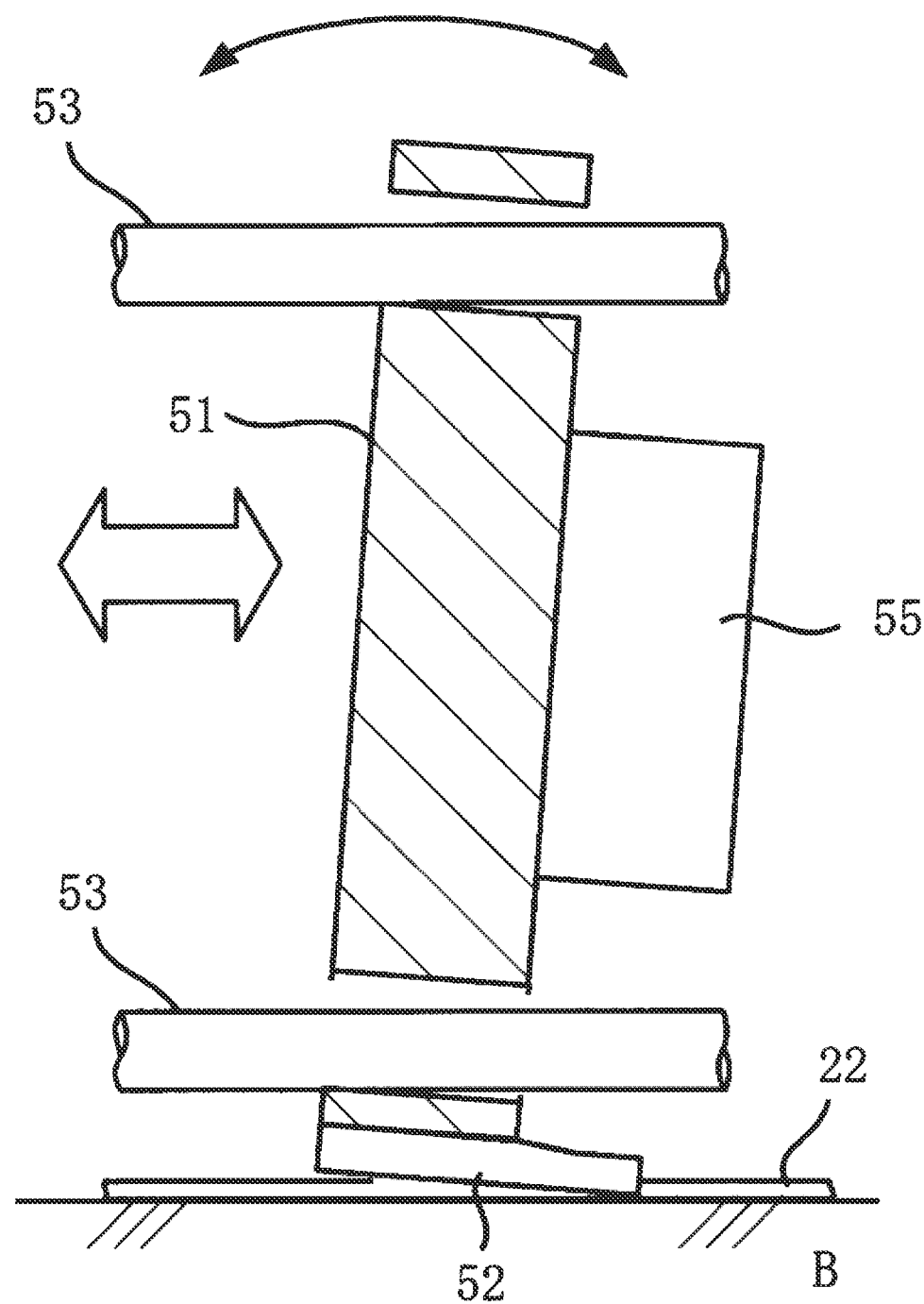
FIG. 5 is a front cross-sectional view showing a related-art movable platen having a linear guide as a guide mechanism, and tie-bars.

FIG. 5 shows a related-art movable platen 51 having only a linear guide 52 as a guide mechanism. Tie-bars 53, 53 also penetrate the movable platen 51, but the tie-bars 53, 53 are provided with no tie-bar guide bush. Molds are opened and closed in a state where a mold 55 having a relatively large weight is provided in the related-art movable platen 51. When the molds are opened and closed at a high speed, the movable platen 51 falls as shown in FIG. 5. In this case, the linear guide 52 is also damaged. The effect of the mold clamping device 2 according to the present illustrative embodiment cannot be obtained.

<Movable Platen According to Second Illustrative Embodiment>

Figure 6:
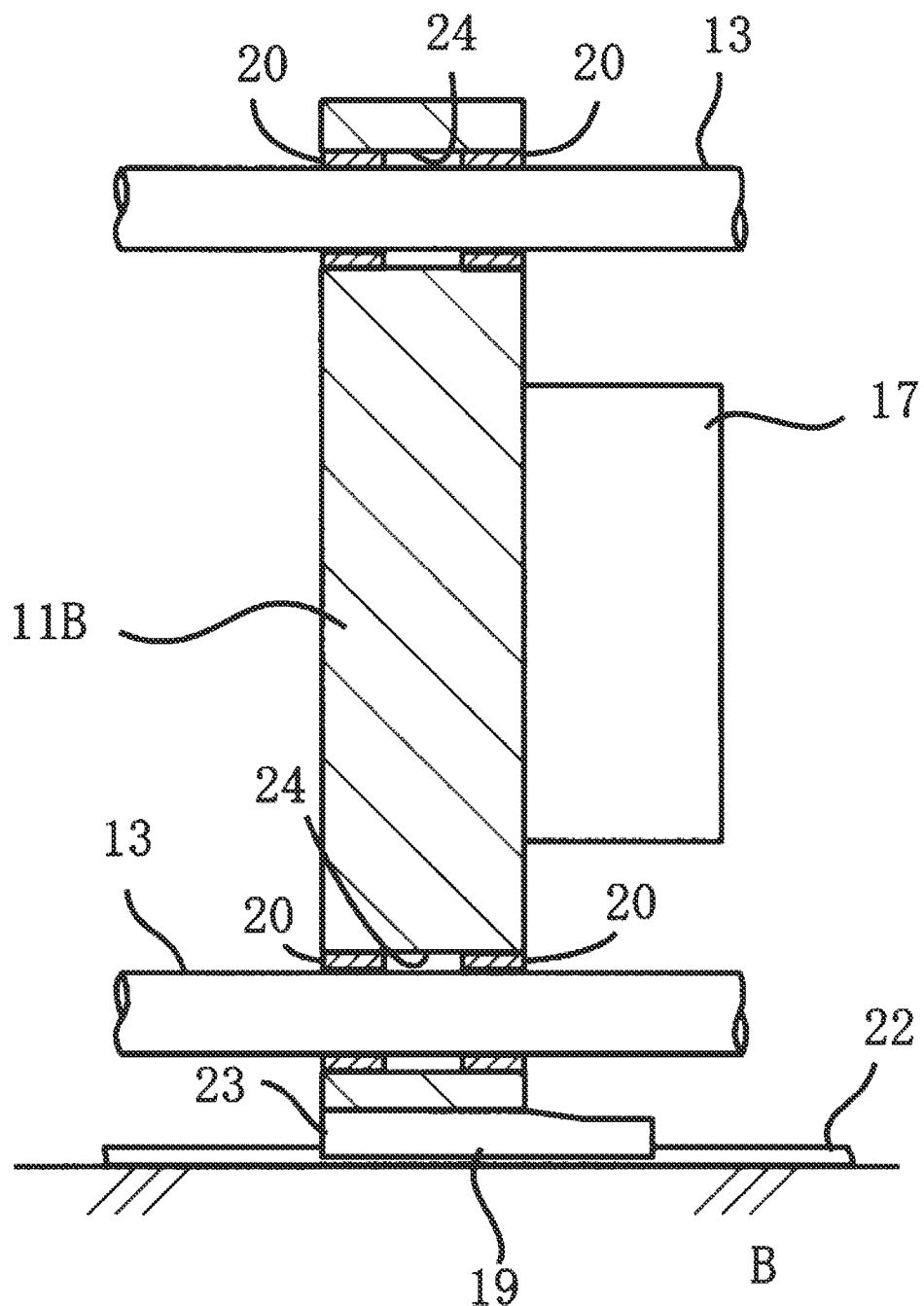
FIG. 6 is a front cross-sectional view showing a movable platen and tie-bars according to a second illustrative embodiment.

In the mold clamping device 2 according to the present illustrative embodiment, the movable platen 11A is deformable. As a modification, a movable platen 11B according to a second illustrative embodiment is shown in FIG. 6. The movable platen 11B according to the second illustrative embodiment is provided with two types of guide mechanisms similarly to the movable platen 11A according to the first illustrative embodiment. That is, the linear guide 19 and the tie-bar guide bushes 20 are provided. However, in the second illustrative embodiment, the tie-bar guide bushes 20 are provided corresponding to all the tie-bars 13. That is, the tie-bar guide bushes 20 are provided in both the tie-bars 13 disposed in the upper portion and the tie-bars 13 disposed in the lower portion. Since the tie-bar guide bushes 20 are clearance-fitted to the tie-bars 13 in a state of loose running fit similarly to the first illustrative embodiment, there is no risk of wear even when the molds are opened and closed at a high speed <Movable Platen According to Third Illustrative Embodiment>

Figure 7:
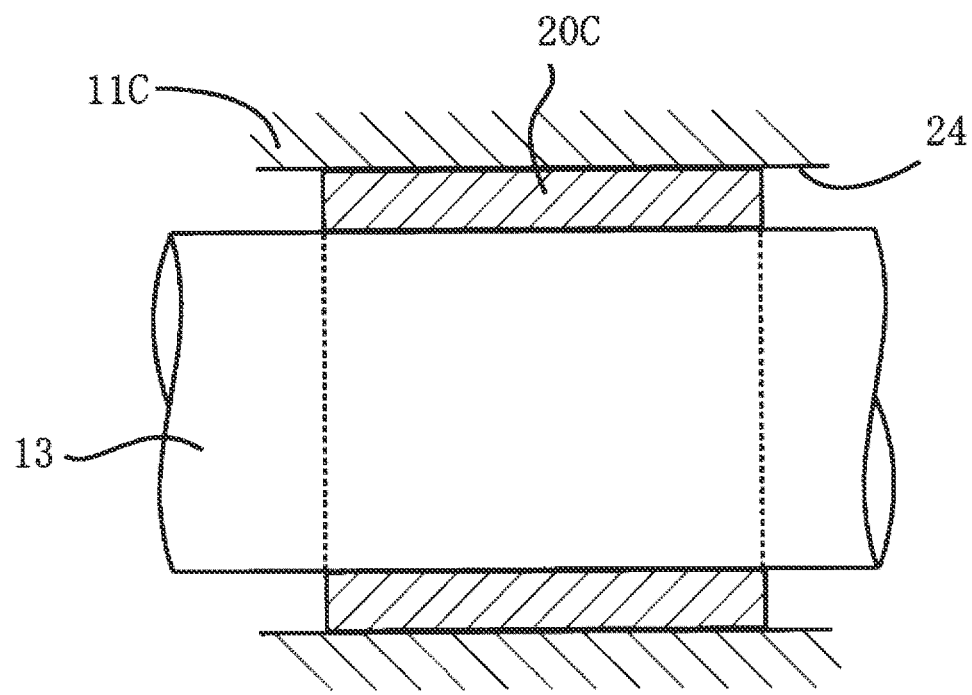
FIG. 7 is a front cross-sectional view showing a part of a movable platen, a tie-bar, and a tie-bar guide bush according to a third illustrative embodiment.

In the movable platens 11A, 11B (see FIGS. 2 and 6) according to the first and second illustrative embodiments, the tie-bar guide bushes 20 can be modified. FIG. 7 shows a movable platen 11C according to a third illustrative embodiment in which a modified tie-bar guide bush 20C is adopted. The tie-bar guide bush 20C is clearance-fitted to the tie-bar 13 in a state of easy running fit. The movable platen 11C according to this illustrative embodiment can also smoothly slide due to two types of guide mechanisms including the linear guide 19 and the tie-bar guide bush 20C.

<Movable Platen According to Fourth Illustrative Embodiment>

Figure 8A:
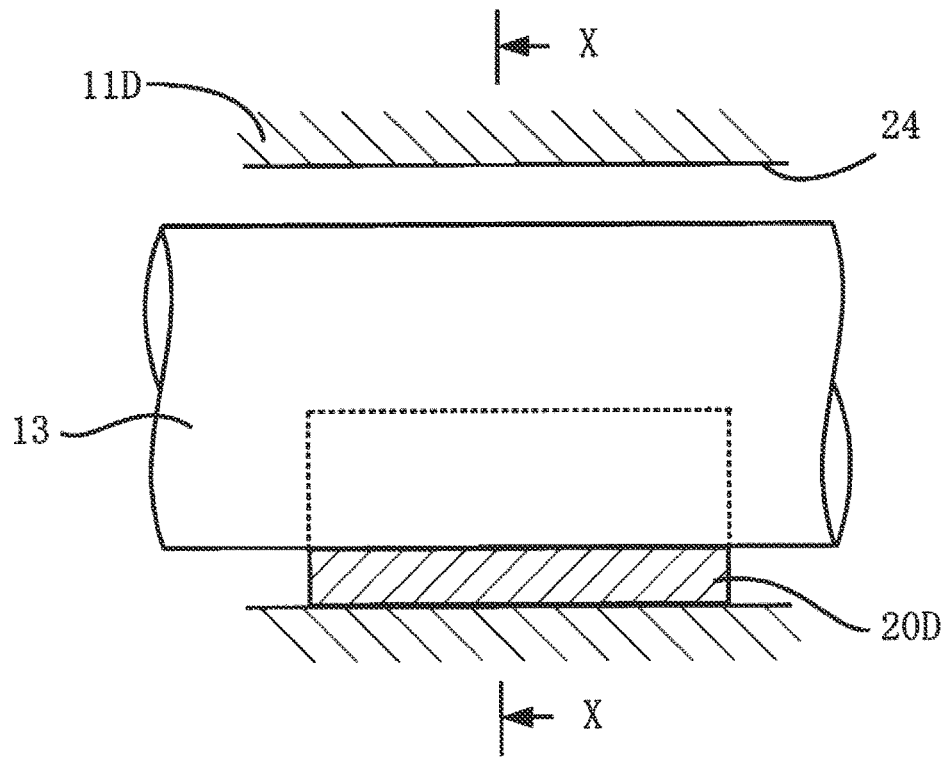
FIG. 8A is a front cross-sectional view showing a part of a movable platen, a tie-bar, and a tie-bar guide bush according to a fourth illustrative embodiment.
Figure 8B:
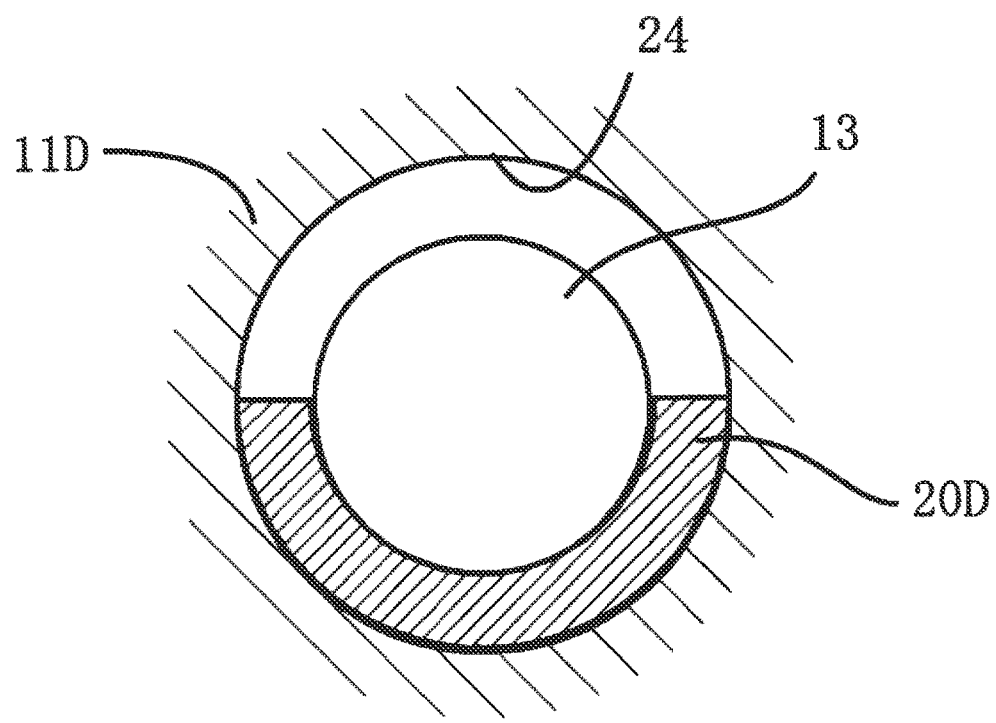
FIG. 8B is a side cross-sectional view showing a part of the movable platen, the tie-bar, and the tie-bar guide bush according to the fourth illustrative embodiment taken along a line X-X in FIG. 8A.

In the movable platens 11A, 11B (see FIGS. 2 and 6) according to the first and second illustrative embodiments, a shape of the tie-bar guide bushes 20 can be modified. FIGS. 8A and 8B show a movable platen 11D according to a fourth illustrative embodiment in which a tie-bar guide bush 20D having a modified shape is provided. The tie-bar guide bush 20D is a part of a hollow cylinder having a C-shaped cross section in a radial direction. The tie-bar guide bush 20D is provided on a lower side of the guide hole 24 of the movable platen 11D and is in contact with a lower side of an outer circumference of the tie-bar 13. That is, the tie-bar guide bush 20D is substantially clearance-fitted to the tie-bar 13 in a state of loose running fit. The movable platen 11D according to the fourth illustrative embodiment can also smoothly slide due to two types of guide mechanisms including the linear guide 19 and the tie-bar guide bush 20D.

Although the disclosure made by the present inventor has been specifically described based on the illustrative embodiments, it is needless to say that the present disclosure is not limited to the illustrative embodiments described above, and various modifications can be made without departing from the scope of the disclosure. A plurality of examples described above can be implemented in combination as appropriate.

What is claimed is:

1. A mold clamping device comprising:
   a fixed platen fixed to a bed;
   a mold clamping housing configured to be slidable on the bed;
   a movable platen configured to be slidable on the bed between the fixed platen and the mold clamping housing;
   a plurality of tie-bars connecting the fixed platen and the mold clamping housing and penetrating the movable platen;
   a mold clamping mechanism provided between the mold clamping housing and the movable platen;
   a linear guide provided with the movable platen and configured to slide with respect to the bed; and
   a tie-bar guide bush provided with the movable platen and configured to slide with respect to the tie-bar,
   wherein, in the movable platen, the tie-bar guide bush is provided for the tie-bar disposed only in an upper portion among the plurality of tie-bars, and
   wherein the tie-bar guide bush is a part of a hollow cylinder having a C-shaped cross section in a radial direction, and is in contact with a lower side of an outer circumference of the tie-bar.

2. The mold clamping device according to claim 1, wherein the tie-bar guide bush has a selected inner diameter so as to be clearance-fitted to the tie-bar in a state of loose running fit.

3. The mold clamping device according to claim 1, wherein the mold clamping mechanism comprises a toggle mechanism provided between the slidable mold clamping housing and the movable platen.

4. The mold clamping device according to claim 1, wherein an inner diameter of the tie-bar guide bush is 0.145 mm or more greater than an outer diameter of the tie-bar.

5. The mold clamping device according to claim 1,
   wherein the movable platen has a plurality of guide holes,
   wherein the plurality of tie-bars penetrates the respective guide holes of the movable platen, and
   wherein the tie-bar guide bush is provided in the guide holes of the movable platen and is configured to slide with respect to the tie-bar.

6. An injection molding machine comprising:
   an injection device configured to inject a resin; and
   a mold clamping device configured to clamp a mold,
   wherein the mold clamping device comprises:
      a fixed platen fixed to a bed;
      a mold clamping housing configured to be slidable on the bed;
      a movable platen configured to be slidable on the bed between the fixed platen and the mold clamping housing;
      a plurality of tie-bars connecting the fixed platen and the mold clamping housing and penetrating the movable platen;
      a mold clamping mechanism provided between the mold clamping housing and the movable platen;
      a linear guide provided with the movable platen and configured to slide with respect to the bed; and
      a tie-bar guide bush provided with the movable platen and configured to slide with respect to the tie-bar,
   wherein, in the movable platen, the tie-bar guide bush is provided for the tie-bar disposed only in an upper portion among the plurality of tie-bars, and wherein the tie-bar guide bush is a part of a hollow cylinder having a C-shaped cross section in a radial direction, and is in contact with a lower side of an outer circumference of the tie-bar.

7. The injection molding machine according to claim 6, wherein the tie-bar guide bush has a selected inner diameter so as to be clearance-fitted to the tie-bar in a state of loose running fit.

8. The injection molding machine according to claim 7, wherein an inner diameter of the tie-bar guide bush is 0.145 mm or more greater than an outer diameter of the tie-bar.

9. The injection molding machine according to claim 6, wherein the mold clamping mechanism comprises a toggle mechanism provided between the slidable mold clamping housing and the movable platen.

10. The injection molding machine according to claim 6, wherein the movable platen has a plurality of guide holes,
wherein the plurality of tie-bars penetrates the respective guide holes of the movable platen, and
wherein the tie-bar guide bush is provided in the guide holes of the movable platen and is configured to slide with respect to the tie-bar.

* * * * *